United States Patent
Spits et al.

(10) Patent No.: US 12,407,101 B2
(45) Date of Patent: Sep. 2, 2025

(54) ANTENNA IMPEDANCE DETECTION AND TUNING

(71) Applicant: QUALCOMM Incorporated, San Diego, CA (US)

(72) Inventors: Erwin Spits, Utrecht (NL); Adrianus Van Bezooijen, Molenhoek (NL)

(73) Assignee: QUALCOMM Incorporated, San Diego, CA (US)

( * ) Notice: Subject to any disclaimer, the term of this patent is extended or adjusted under 35 U.S.C. 154(b) by 208 days.

(21) Appl. No.: 17/949,958

(22) Filed: Sep. 21, 2022

(65) Prior Publication Data
US 2024/0097333 A1 Mar. 21, 2024

(51) Int. Cl.
*H01Q 3/24* (2006.01)
*H01Q 5/335* (2015.01)
*H04B 7/06* (2006.01)
*H04L 5/00* (2006.01)

(52) U.S. Cl.
CPC .......... *H01Q 5/335* (2015.01); *H04B 7/0652* (2013.01); *H04B 7/0691* (2013.01); *H04L 5/0048* (2013.01)

(58) Field of Classification Search
CPC .. H04B 1/0458; H04B 17/103; H04B 7/0691; H04B 1/18; H04B 7/0652; H01Q 5/335; H01Q 21/28; H01Q 3/24; H04L 5/0048
See application file for complete search history.

(56) References Cited

U.S. PATENT DOCUMENTS

| | | | | |
|---|---|---|---|---|
| 5,038,112 A * | 8/1991 | O'Neill | ............... | H03G 3/3047 330/207 P |
| 5,956,627 A * | 9/1999 | Goos | ........................ | H03G 1/04 455/127.1 |
| 7,180,452 B2 * | 2/2007 | Saito | ..................... | H01Q 1/244 343/702 |
| 10,673,514 B1 * | 6/2020 | Klomsdorf | ............ | H04B 17/14 |
| 2001/0039198 A1 * | 11/2001 | Onishi | ................. | H04B 7/0604 455/562.1 |
| 2004/0229588 A1 * | 11/2004 | Cho | ...................... | H04W 52/24 455/278.1 |
| 2005/0215198 A1 * | 9/2005 | Fifield | ................... | H04B 1/0475 455/63.1 |
| 2007/0155344 A1 * | 7/2007 | Wiessner | ............... | H04B 1/006 455/78 |
| 2009/0323582 A1 * | 12/2009 | Proctor, Jr. | .......... | H04B 7/0617 455/7 |

(Continued)

FOREIGN PATENT DOCUMENTS

CN 109150327 B 4/2021

OTHER PUBLICATIONS

International Search Report and Written Opinion—PCT/US2023/031306—ISA/EPO—Jan. 3, 2024.

*Primary Examiner* — Dimary S Lopez Cruz
*Assistant Examiner* — Bamidele A Immanuel
(74) *Attorney, Agent, or Firm* — Polsinelli/Qualcomm Incorporated

(57) ABSTRACT

A user equipment (UE) is provided that includes an antenna switch array for demultiplexing a reference signal sequentially to each antenna in a plurality of antennas. While the antenna switch array selects an antenna, the UE measures a reflection coefficient for the antenna. The UE then tunes the antenna responsive to the reflection coefficient measurement.

21 Claims, 7 Drawing Sheets

(56) References Cited

U.S. PATENT DOCUMENTS

| | | | | |
|---|---|---|---|---|
| 2010/0002620 A1* | 1/2010 | Proctor, Jr. | H04B 7/15585 | 370/315 |
| 2010/0222012 A1* | 9/2010 | Shibuya | H04B 17/336 | 455/79 |
| 2010/0244978 A1* | 9/2010 | Milosavljevic | H04B 1/0458 | 333/33 |
| 2011/0250926 A1* | 10/2011 | Wietfeldt | H01Q 1/243 | 455/525 |
| 2013/0322562 A1* | 12/2013 | Zhang | H04B 7/0808 | 375/267 |
| 2014/0051477 A1* | 2/2014 | Zhang | H04W 88/06 | 455/552.1 |
| 2014/0132465 A1* | 5/2014 | Sanchez | H01Q 21/28 | 343/745 |
| 2014/0287704 A1* | 9/2014 | Dupuy | H04B 1/18 | 455/114.2 |
| 2015/0038094 A1* | 2/2015 | Maxim | H03F 3/68 | 455/77 |
| 2015/0072632 A1* | 3/2015 | Pourkhaatoun | H03F 3/245 | 455/127.2 |
| 2015/0200646 A1* | 7/2015 | Peng | H04B 1/0458 | 455/77 |
| 2015/0318610 A1* | 11/2015 | Lee | H01Q 3/34 | 375/267 |
| 2015/0326254 A1* | 11/2015 | Feldman | H04B 1/3827 | 455/83 |
| 2016/0173172 A1* | 6/2016 | Greene | H04W 24/10 | 455/562.1 |
| 2016/0277129 A1* | 9/2016 | Manssen | H04B 1/0458 | |
| 2016/0308626 A1* | 10/2016 | Mow | H04B 17/14 | |
| 2017/0026020 A1* | 1/2017 | Solomko | H03H 7/48 | |
| 2017/0070246 A1* | 3/2017 | Natesan | H04B 1/0458 | |
| 2017/0084989 A1* | 3/2017 | Shi | H01Q 1/243 | |
| 2017/0125900 A1* | 5/2017 | Xu | H01Q 1/243 | |
| 2017/0244451 A1* | 8/2017 | Raghavan | H04L 7/04 | |
| 2018/0054832 A1* | 2/2018 | Luo | H04W 52/42 | |
| 2019/0097316 A1* | 3/2019 | Cruise | H01Q 3/22 | |
| 2019/0159129 A1* | 5/2019 | Choi | H04B 1/40 | |
| 2019/0181550 A1* | 6/2019 | Chen | H01Q 21/28 | |
| 2021/0126697 A1* | 4/2021 | Kumar | H04B 7/0695 | |

* cited by examiner

ANTENNA IMPEDANCE DETECTION AND TUNING

FIELD OF TECHNOLOGY

The present disclosure relates generally to wireless communication and more specifically to antenna impedance detection and tuning.

BACKGROUND

To achieve ever higher data rates in modern wireless communication systems such as fifth generation (5G) systems, cellular handsets have evolved to include an array of antennas. Using an array of antennas as compared to a single antenna has several advantages. For example, as the received signal strength drops, the signal-to-noise ratio becomes a limiting factor on the achievable data rate. But the use of multiple receive antennas enables multiple-in-multiple-out (MIMO) and beamforming techniques to increase the received signal strength and thus enhance the achievable data rate. Similarly, the use of multiple transmit antennas permits a transmitter to beamform and/or beamsteer the transmitted signal to achieve higher data rates.

The use of distinct transmit and receive antennas in a user equipment (UE) complicates the antenna characterization and impedance matching because the UE has no direct way of characterizing an impedance matching of the receive antennas during normal operation. With respect to this impedance matching, a UE may include a radio frequency frontend circuit (RFFE) that couples to the transmit antennas through an RFFE output impedance. Optimum power transfer occurs when this RFFE output impedance matches the impedance of the transmit antennas. Similarly, the RFFE couples to the receive antennas through an RFFE input impedance that should match the impedance of the receive antennas. The RFFE output and input impedances may be controlled through design to equal some desired value such as 50Ω. But each transmit and receive antenna in a UE may have a unique orientation and position within the UE, which varies their impedances. Moreover, the antenna impedances may change depending upon how a user handles the UE. In addition, coupling of the transmit antennas and/or the receive antennas changes their impedance. The matching of the RFFE impedances to the antenna impedances is thus problematic.

SUMMARY

The following summary discusses some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In accordance with an aspect of the disclosure, an apparatus for wireless communication is provided that includes: a plurality of antennas including at least one transmit antenna and at least one receive antenna; an amplifier; an antenna switch array coupled to the plurality of antennas; a directional coupler coupled between the amplifier and the antenna switch array; and a controller configured to: control the antenna switch array to sequentially select each antenna in the plurality of antennas so as to transmit a reference signal amplified by the amplifier from the antenna and to cause the directional coupler to produce a reflected signal from the antenna; and determine a reflection coefficient for each antenna responsive to a reflected signal from the antenna.

In accordance with another aspect of the disclosure, a user equipment (UE) for wireless communication is provided that includes: a transmit antenna; a receive antenna; a transceiver configured to generate one or more sounding reference signals (SRS) for wireless channel estimation; an antenna switch array configured to separately select the transmit antenna and the receive antenna in sequence to transmit the one or more SRS; a first tuner coupled between the transmit antenna and the antenna switch array; a second tuner coupled between the receive antenna and the antenna switch array; a directional coupler coupled between the transceiver and the antenna switch array; and a controller configured to adjust the first tuner and the second tuner based on signals from the directional coupler during the sequence.

In accordance with yet another aspect of the disclosure, a method for wireless communication is provided that includes: sequentially selecting each antenna in a plurality of antennas of the UE through an antenna switch array; and while each antenna is selected by the antenna switch array: amplifying a reference signal through an amplifier to provide an amplified reference signal; transmitting the amplified reference signal through the antenna to cause a reflected signal to reflect back to the amplifier; evaluating an impedance matching of the antenna based upon a sample of the amplified reference signal and a sample of the reflected signal; and tuning the impedance matching of the antenna based on the evaluating of the impedance matching.

Other aspects, features, and implementations of the present disclosure will become apparent to those of ordinary skill in the art, upon reviewing the following description of specific, exemplary implementations of the present disclosure in conjunction with the accompanying figures. While features of the present disclosure may be discussed relative to certain implementations and figures below, all implementations of the present disclosure can include one or more of the advantageous features discussed herein. In other words, while one or more implementations may be discussed as having certain advantageous features, one or more of such features may also be used in accordance with the various implementations of the disclosure discussed herein. In similar fashion, while exemplary implementations may be discussed below as device, system, or method implementations it should be understood that such exemplary implementations can be implemented in various devices, systems, and methods.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various implementations and to explain various principles and advantages in accordance with the present disclosure.

DETAILED DESCRIPTION

Figure 1:
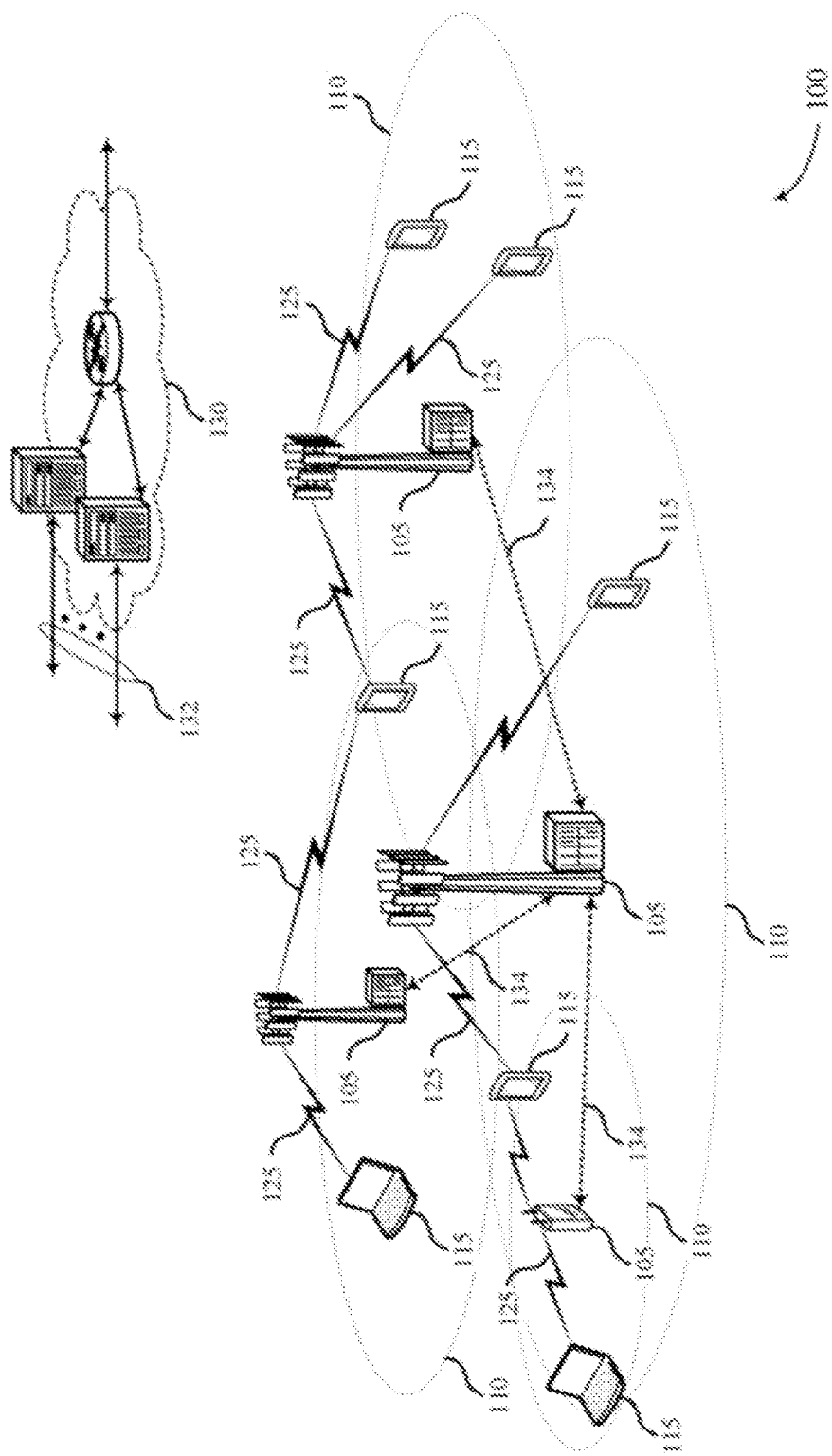
FIG. 1 illustrates an example system for wireless communication in accordance with aspects of the present disclosure.

The following detailed description is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

If an antenna is functioning ideally, a guided electromagnetic wave generated and amplified by a transceiver will be completely converted by the antenna into a free-space electromagnetic wave. But in a real-world antenna some of the guided electromagnetic wave is instead reflected back to the transceiver instead of being converted into a free-space electromagnetic wave. A ratio of this reflected signal to the transmitted or forward signal defines a reflection coefficient $\Gamma$ for the antenna. It is advantageous for a transceiver to characterize this parameter so that the user interaction condition may be determined and so that the antenna impedance may be tuned to optimize the power transfer.

Such a characterization is impeded by the bifurcation of the transceiver's antennas into transmit antennas and receive antennas. The systems disclosed herein overcome this issue by exploiting the use of a reference signal that is periodically transmitted separately over each transmit antenna and over each receive antenna. The following discussion will assume that the reference signal is a sounding reference signal (SRS), but it will be appreciated that other types of reference signals may be used. To characterize the impedance of the transmit antenna as well as the receive antennas, a user equipment transmits the reference signal sequentially over each antenna. The reference signal transmission serially sequences through the antennas, both through the transmit antennas and through the receive antennas. During the reference signal transmission through each antenna, the user equipment drives the reference signal to the antenna through a directional coupler. The directional coupler samples a reflected signal from the selected antenna during the reference signal transmission. By comparing a magnitude and phase of the incident (forward) signal to a magnitude and phase of the reflected signal as sampled by the directional coupler, the user equipment may characterize a (real or complex) impedance of the antenna. In this fashion, by sequentially transmitting the reference signal through each antenna, the UE may characterize the impedance of both the transmit antennas and the receive antennas. As used herein, the terms "antenna impedance characterization" and "antenna reflection coefficient" characterization are used interchangeably.

As the antenna impedance is characterized for an antenna, the UE may then adjust an antenna tuning circuit coupled to the antenna to better match the antenna to the UE's RFFE. The antenna tuning circuit may intervene between the RFFE and the corresponding antenna. Maximum power transfer between an antenna and the RFFE then occurs if the impedance of the antenna tuning circuit is a complex conjugate of the antenna impedance. For example, suppose that the antenna impedance is determined to equal R+jX, where R is a resistance, X is a reactance, and j is the square root of −1. The UE may then adjust the impedance of the antenna tuning circuit to equal R−jX for maximum power transfer.

Techniques as discussed herein allow a UE to detect an antenna impedance of both transmit (TX) and receive (RX) antennas using a reference signal transmission. Although the following discussion will assume that the reference signal is a sounding reference signal, other types of reference signals such as an uplink demodulation reference signal (DM-RS) specific to each UE may be used. Taking the SRS as an example, a UE may transmit an SRS sequentially through each of its antennas, including TX and RX antennas, to a base station. The base station, in turn, may characterize the uplink channel for each antenna based on the received SRS. The transmission of the SRS provides a window to detect the antenna impedance by comparing the incident power and the reflected power during the transmission. As the SRS transmission cycles through the antennas, the corresponding antenna impedances are sequentially detected. In some implementations, the reference signal may be transmitted with a user-determined power level.

To provide a better appreciation of the advantageous properties of this characterization of antenna impedance in both TX and RX antennas of a UE by sequentially transmitting a reference signal, some example wireless communication systems supporting this impedance characterization will first be discussed. In addition, the frame structure of example reference signal(s), in particular the SRS, will also be discussed.

FIG. 1 illustrates an example wireless communication system 100 that supports SRS for wireless channel estimation in accordance with various aspects of the present disclosure. The wireless communication system 100 includes base stations 105, UEs 115, and a core network 130. In some implementations, the wireless communication system 100 may be a Long Term Evolution (LTE) network, an LTE-Advanced (LTE-A) network, an LTE-A Pro network, or a New Radio (NR) network. In other implementations, wireless communication system 100 may support enhanced broadband communication, ultra-reliable (e.g., mission critical) communication, low latency communication, or communication with low-cost and low-complexity devices.

Base stations 105 may wirelessly communicate with UEs 115 via one or more base station antennas. Base stations 105 may include or may comprise a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable components. Wireless communication system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like, and/or may be able to communicate directly with each other.

Each base station 105 may be associated with a geographic coverage area 110 in which communication with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communication system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

UEs 115 may be dispersed throughout the wireless communication system 100, and each UE 115 may be stationary or mobile. A UE 115 may also be referred to as a mobile device, a wireless device, a remote device, a handheld device, or a subscriber device, or some other suitable terminology, in which the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an machine-type communication (MTC) device, or the like, which may be implemented in various articles such as appliances, vehicles, meters, or the like.

Some UEs 115 may be configured to employ operating modes that reduce power consumption, such as half-duplex communication (e.g., a mode that supports one-way communication via transmission or reception, but not transmission and reception simultaneously). In some examples, half-duplex communication may be performed at a reduced peak rate. Other power conservation techniques for UEs 115 include entering a power saving "deep sleep" mode when not engaging in active communication, or operating over a limited bandwidth (e.g., according to narrowband communication). In some cases, UEs 115 may be designed to support critical functions (e.g., mission critical functions), and a wireless communication system 100 may be configured to provide ultra-reliable communication for these functions.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

Wireless communication system 100 may operate using one or more frequency bands, such as in the range of 300 megahertz (MHz) to 300 gigahertz (GHz) or higher. The region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the lower frequencies and longer wavelengths of the high frequency (HF) or very high frequency (VHF) portion of the spectrum below 300 MHz.

Wireless communication system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communication system 100 may also operate in an extremely high frequency (EHF) region of the spectrum (e.g., from 30 GHz to 300 GHz or higher), also known as the millimeter band (which may also include some frequencies in the 20 GHz range in certain systems). In some examples, wireless communication system 100 may support millimeter wave (mmW) communication between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communication system 100 may utilize both licensed and unlicensed radio frequency spectrum bands. For example, wireless communication system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ LBT procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at some orientations with respect to an antenna array experience constructive interference while others experience destructive interference. The adjustment of signals communicated via the antenna elements may include a transmitting device or a receiving device applying one or more amplitude and phase offsets to signals carried via each of the antenna elements associated with the device. The adjustments associated with each of the antenna elements may be defined by a beamforming weight set associated with an orientation (e.g., with respect to the antenna array of the transmitting device or receiving device, or with respect to some other orientation).

Figure 2:
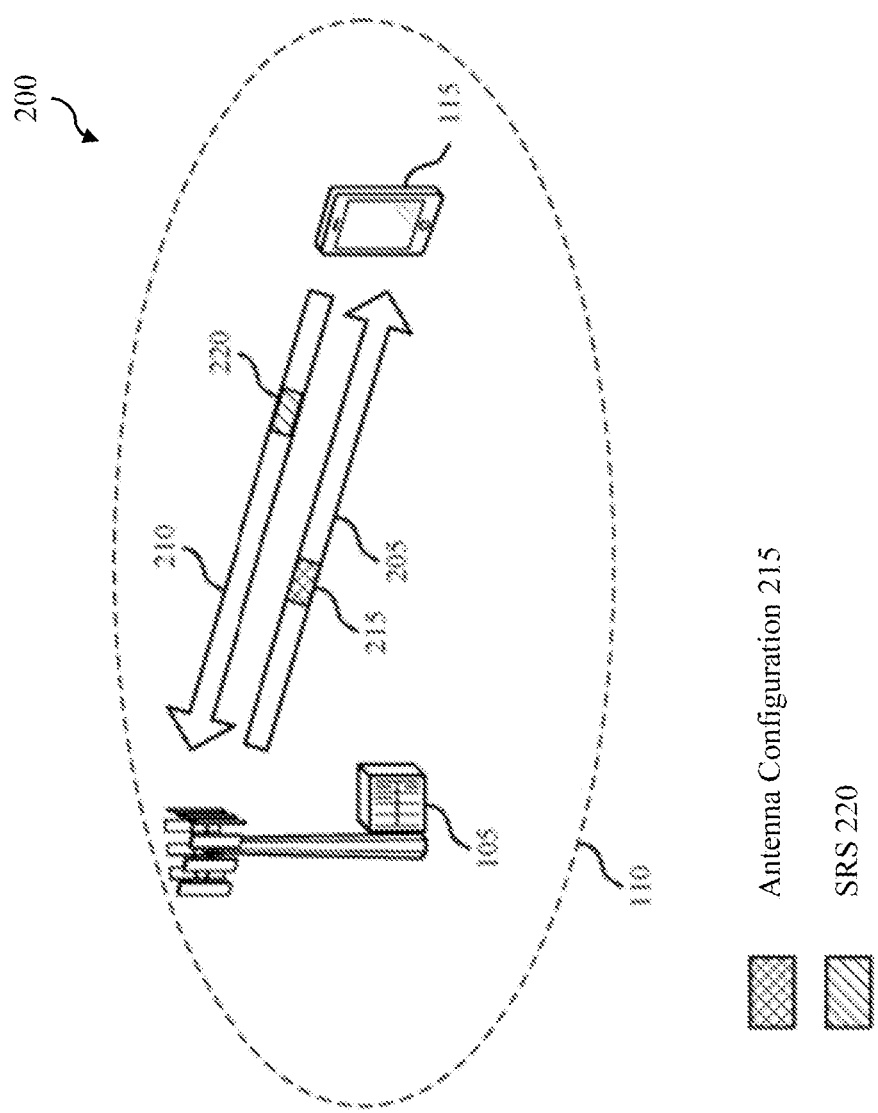
FIG. 2 illustrates an example system for wireless communication that supports sounding reference signals in accordance with aspects of the present disclosure.

FIG. 2 illustrates a portion of an example wireless communication system 200 that supports the use of SRS for wireless channel estimation. In some examples, wireless communication system 200 may implement aspects of wireless communication system 100. In this example, wireless communication system 200 includes a base station 105 and a UE 115, which may be examples of corresponding devices as discussed with respect to FIG. 1. FIG. 2 illustrates one base station 105 and one UE 115 for purposes of simplicity of discussion, though it will be recognized that embodiments of the present disclosure may scale to many more UEs 115 and/or base stations 105. The UE 115 and the base station 105 may communicate with each other at various frequencies. For example, in one embodiment the UE 115 and the base station 105 may communicate at sub-6 GHz frequencies, while in another embodiment at 6 GHz (or higher) frequencies, to name just two examples. The base station 105 may transmit data and control information to the UE 115 via downlink 205, and the UE 115 may transmit data and control information to the base station 105 via uplink 210.

Figure 3:
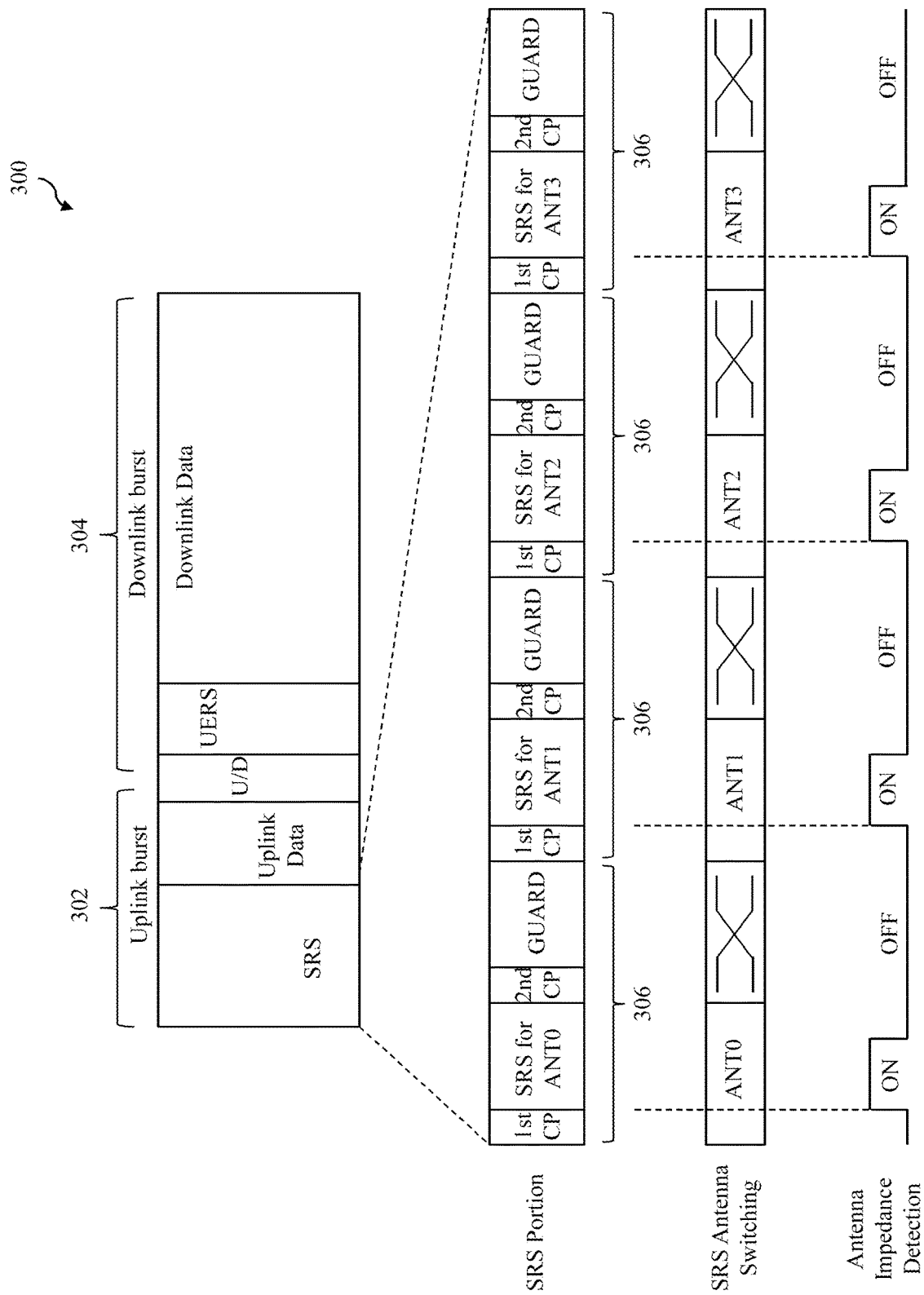
FIG. 3 illustrates an example subframe structure that includes a sounding reference signal in accordance with aspects of the present disclosure.

In this example, the base station 105 may transmit SRS configuration information to the UE 115, which may configure one or more SRS transmissions 220 by the UE 115 via uplink 210. After receiving the SRS configuration information from the base station 105, the UE 115 broadcasts the SRS 220 to the base station 105. The UE 115 may include multiple antennas, such as a configuration of one TX antenna and two RX antennas (1T2R), one TX antenna and four RX antennas (1T4R), two TX antennas and four RX antennas (2T4R), four TX antennas and four RX antennas (4T4R), or other suitable TX and RX antennas combinations. For the UE 115 with multiple antennas, each antenna is selected in turn to transmit an SRS in corresponding slots of time within the uplink portion of a subframe structure (e.g., an example subframe structure 300 as depicted in FIG. 3 and discussed further herein). Upon receipt of the SRS 220, the base station 105 may determine channel information for the uplink channel between the UE 115 and the base station 105. The base station 105 may then use that uplink channel information to train its antennas to beamform downlink 205 to the UE 115. The base station 105 may also use that uplink channel information to determine which frequency band or which RX antenna among the multiple RX antennas of the UE 115 may provide better use of available bandwidth in the wireless communication channels and send an antenna configuration 215 accordingly to the UE 115. The antenna configuration 215 may select an RX antenna (or antennas) of the UE 115 for subsequent data reception.

A single subframe 300 is illustrated in FIG. 3 for ease of illustration; as will be recognized, the structure of the SF 300 is scalable to any number of subframes as necessary or desired. Each SF 300 includes a plurality of time slots 306 with each time slot 306 including a plurality of orthogonal frequency division multiplexing (OFDM) symbols. The various time slots 306 in a SF 300 may be divided into an uplink portion 302 and a downlink portion 304, separated by a transition portion U/D. As part of the uplink portion 302, the UE 115 may send various types of signals to the base station 105. These may include, for example, an SRS, uplink data, and optionally requests for information (e.g., in an uplink burst). The transition portion U/D is provided between the uplink portion 302 and the downlink portion 304. During the downlink portion 304, the base station 105 sends various types of signals to the UE 115, including for example a user-equipment reference signal (UERS) and downlink data (e.g., in a downlink burst).

Inside each time slot 306, an SRS may span one, two, or four consecutive OFDM symbols that are located within the last six OFDM symbols of the time slot 306. Each antenna may transmit its own SRS such that the sounding reference signals are multiplexed across a UE's antennas, each antenna having its own SRS in a corresponding slot 306. Each slot 306 may contain a first cyclic prefix (CP) prepended to the OFDM symbols of multiplexed SRS. Each slot 306 may also contain a second CP prepended to a guard period. The guard period ensures enough time for the UE 115 to perform SRS antenna switching.

Also illustrated in FIG. 3 is the timing of an SRS antenna switching and antenna impedance detection. At the beginning of each slot 306, an antenna switch array (discussed further herein) is configured to couple an amplifier that amplifies the SRS to a selected antenna. When the selected antenna transmits the demultiplexed SRS as routed through the antenna switch array, an antenna impedance detection is also performed (as denoted by an "ON" duration). The duration of the antenna impedance detection may be shorter than the transmission time of the demultiplexed SRS by the selected antenna, such that the detection is finished ("OFF") before the 2nd CP prepended to the guard period begins. During the transmission of the SRS from a selected antenna, the SRS may be transmitted at a single carrier frequency, which allows the antenna impedance to be detected at a fixed frequency point; alternatively, the SRS may hop in carrier frequencies, which allows the antenna impedance to be detected at multiple frequencies. When the transmission of the SRS by the selected antenna is finished, the antenna switch array is configured to disconnect the selected antenna from amplifier. Note that an antenna impedance detection need not be performed for every SRS transmission.

In SF 300, the UE has four antennas, ranging from an antenna 0 (ANT0) to an antenna 3 (ANT3). There are thus four slots 306 corresponding to the selection of a respective antenna. The order of the antenna selection is arbitrary so long as each antenna is selected for which a reflection coefficient characterization is desired. In a first slot 306, the antenna 0 is selected by the antenna switch array and its reflection coefficient characterized. In a second slot 306, the antenna switch array selects for a first antenna (ANT1) so that its reflection coefficient may be characterized. In a third slot 306, the antenna switch array selects for a second antenna (ANT2) so that its reflection coefficient may be characterized. Finally, in a fourth slot 306, the antenna switch array selects for the third antenna (ANT3) so that its reflection coefficient may be characterized. As a result, the UE has advantageously characterized the reflection coefficient of its antennas (both receive and transmit) in the SRS portion of uplink burst 302 of subframe 300. Since the reflection coefficient is also denoted as gamma ($\Gamma$), the resulting characterization by the UE may be denoted as an SRS speed gamma detection as it may be completed within the relatively brief SRS portion of uplink burst 302. The SRS speed gamma detection disclosed herein allows the UE to tune its antenna impedances to provide a reduction in call drops and/or a reduction in power consumption.

The four slots 306 shown in FIG. 3 correspond to a UE having four antennas. The SRS portion may contain more or fewer slots 306 depending on the number of antennas to be characterized in the UE. Since the antenna impedance will change such as through user interactions with the UE, the sequence of SRS transmissions may be periodically repeated so that the antenna impedance characterizations may be updated accordingly. The SRS may be identical for each antenna transmission. Alternatively, the SRS may be unique for each antenna, such that the base station 105 is able to identify which antenna is transmitting the respective SRS.

Still further, the SF 300 may be provided as part of a synchronous system, such that the SF 300 is provided repeatedly over time so that the base station 105 may adjust its antenna beams to accommodate for UE 115 motion and channel decorrelation related to that movement (and/or other influences). Channel reciprocity may allow the base station 105 to apply information about the channel in the uplink direction to estimate one or more channel properties in the downlink direction, which can be used to beamform the downlink transmissions. In this manner, the base station 105 can direct its antenna beam(s) based on the SRS from the UE 115. The SRS may further include information that allows the base station 105 to demodulate data received from the UE 115 during the uplink portion 302 of the SF 300. The base station 105 may additionally determine, from the SRS, scheduling information that allows the base station 105 to schedule a future SF 300 (e.g., frequency bands, etc.) for communicating with the UE 115 or to instruct the UE 115 which RX antenna provides a higher efficiency of bandwidth usage to select for subsequent data reception. In addition, the repeated transmission of the SRS sequence allows the UE 115 to collect antenna impedance values for the same antenna multiple times and average the values with an improved accuracy. An example UE 115 will now be discussed in more detail.

Figure 4:
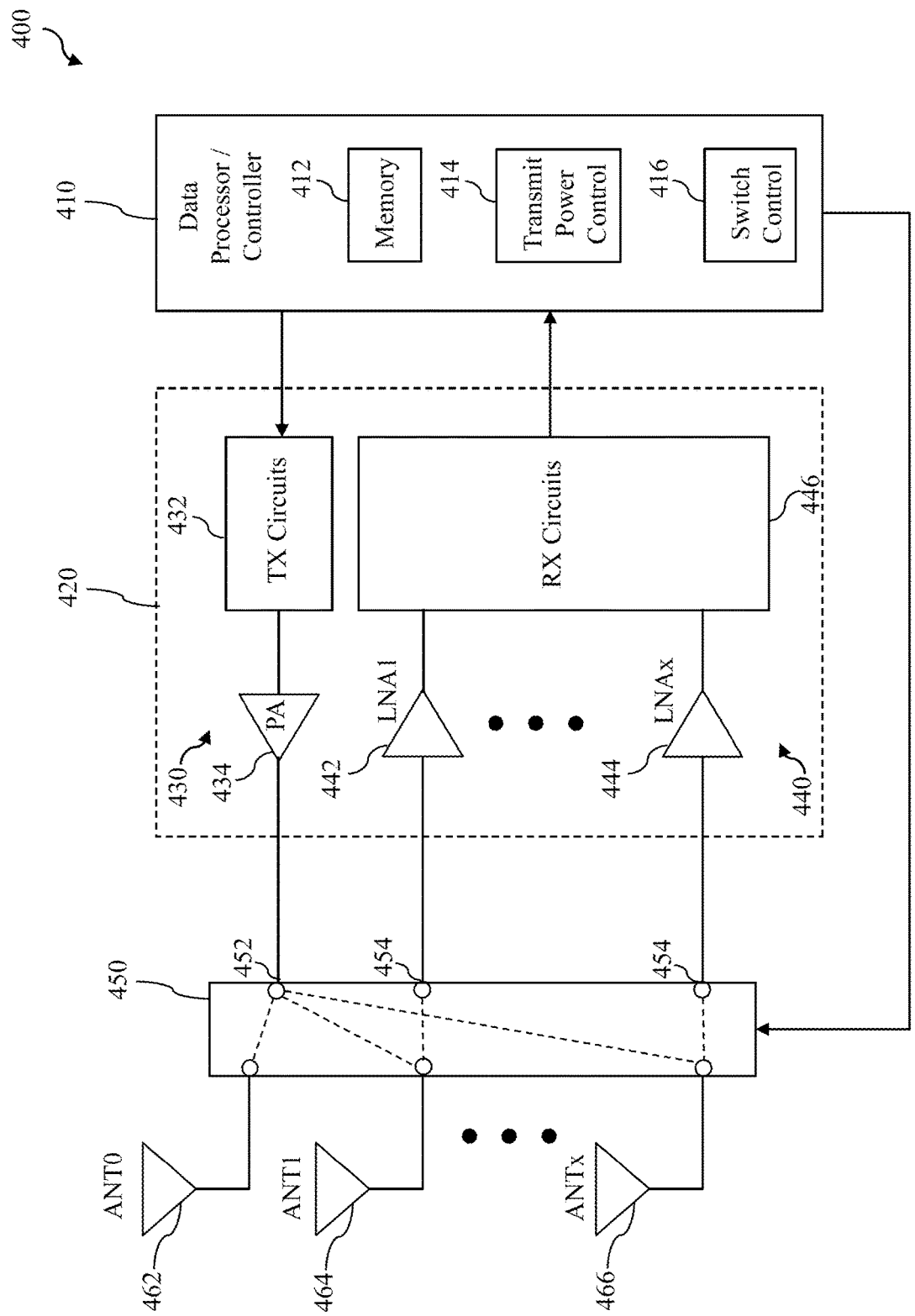
FIG. 4 illustrates an example wireless communication device that supports sounding reference signals in accordance with aspects of the present disclosure.

FIG. 4 is a circuit diagram 400 of an example UE 115. In this exemplary design, the UE 115 includes a data processor (or controller) 410, a transceiver 420, an antenna switch array 450, and a plurality of antennas including an antenna 462, an antenna 464, and an antenna 466. The data processor 410 may be implemented as a modem. The transceiver 420 includes a transmitter 430 and a receiver 440 that support bi-directional wireless communication. The data processor 410 processes (e.g., encodes and modulates) data to be transmitted and provides an output signal to the transmitter 430. A memory 412 in data processor 410 may store program codes and data for the data processor 410. A transmit power controller 414 controls the transmit power of the transceiver 420. A switch controller 416 controls the antenna selection by antenna switch array 450. Each of the memory 412, transmit power controller 414, and switch controller 416 may be internal to data processor 410 (as shown in FIG. 4) or be external to data processor 410. Within the transmitter 430, TX circuits 432 amplify, filter, and upconvert the output signal from baseband to RF and provide a modulated signal. The TX circuits 432 may include amplifiers, filters, mixers, an oscillator, a local oscillator (LO) generator, a phase locked loop (PLL), etc. A power amplifier (PA) 434 receives and amplifies the modulated signal to provide an amplified RF signal having the proper output power level. During normal operation (non-SRS transmission), the amplified RF signal is provided to the corresponding TX antennas such as antenna 462 through a selection by antenna switch array 450. In this normal operation, each of the RX antennas such as antennas 464 and 466 receives signals from the base station 105 and/or other transmitter stations and provides a received RF signal. The received RF signal is routed through antenna switch array 450 and provided to corresponding low noise amplifiers (LNAs) such as LNAs 442 and 444 in the receiver 440. LNA 442 amplifies the received RF signal from the RX antenna 464 and provides an LNA output signal. Similarly, LNA 444 amplifies the received RF signal from the RX antenna 466 and provides an LNA output signal. RX circuits 446 downconvert the LNA output signals from RF to baseband, amplify and filter the down converted signals, and provide input signals to the data processor 410. The RX circuits 446 may include amplifiers, filters, mixers, an oscillator, an LO generator, a PLL, and other suitable components.

To perform the demultiplexing of the SRS from power amplifier 434 to the antennas, the antenna switch array 450 may include a "1" pole "N" throw (1PNT) switch 452 (N being an integer equaling the number of TX and RX antennas of the UE 115) to couple the PA 434 to any of the antennas. The antenna switch array 450 may also include multiple "1" pole "1" throw (1P1T, or single pole single throw) switches 454 (the number of 1P1T switches being equal to the number of RX antennas) to provide a one-to-one connection between each of the RX antennas and a respective LNA. When the UE 115 is in data transmission or reception (e.g., during the uplink data portion in the SF 300 or the downlink data portion in the SF 300 in FIG. 3), the antenna switch array 450 may couple the PA 434 to the TX antenna 462, the LNA 442 to the RX antenna 464, and the LNA 444 to the RX antenna 466. When the UE 115 is transmitting the SRS (e.g., during the SRS portion in the SF 300 in FIG. 3), the antenna switch array 450 may disconnect the LNAs from the RX antennas and connect the PA 434 sequentially to each of the antennas. The data processor 410 generates the baseband SRS, which is then converted to RF in TX circuits 432 and amplified by PA 434 before being switched through antenna switch array 450 to sequence through the antennas. While a multi-throw and several single throw switches are described as being included in the antenna switch array 450, other switches, combinations of components, or connections may be included in the antenna switch array 450. Further, it will be understood that while the terms "TX antenna" and "RX antenna" are used herein, there may be times, modes or configurations in which a TX antenna operates to receive and/or there may be times, modes, or configurations in which an RX antenna operates to transmit.

The voltage standing wave ratio (VSWR) is a figure of merit that can be derived from the reflection coefficient. The VSWR indicates how well an antenna is impedance matched to its transceiver. Since the VSWR and the reflection coefficient are related, the VSWR may vary based on external factors. For example, the VSWR for an antenna may vary depending on the way a user holds the UE. If a radio is being held, the antenna may be blocked by part of the holder's body. For example, if a mobile telephone handset is held to the person's head, the person's head may block the antenna. The mobile telephone handset's antenna may be blocked by the person's hand or another body part.

Referring again to FIG. 4, a measurement circuit (not illustrated) may be included in the UE 115 to measure the reflection coefficient for each antenna. The measurement circuit may be part of the transceiver 420, part of other circuitry in the UE 115, or some combination of circuitry in the transceiver 420 and other circuitry. For example, in the transceiver 420, a high-power detector (HDET) may be used to detect incident power to an antenna and reflected power from the antenna (magnitude only). In some examples, a complex detector may detect both a magnitude and phase of the incident and reflected signals. For example, the phase may be derived if both in-phase and quadrature-phase signaling is supported by the transceiver 420. The measurement circuit will now be discussed in more detail.

Figure 5:
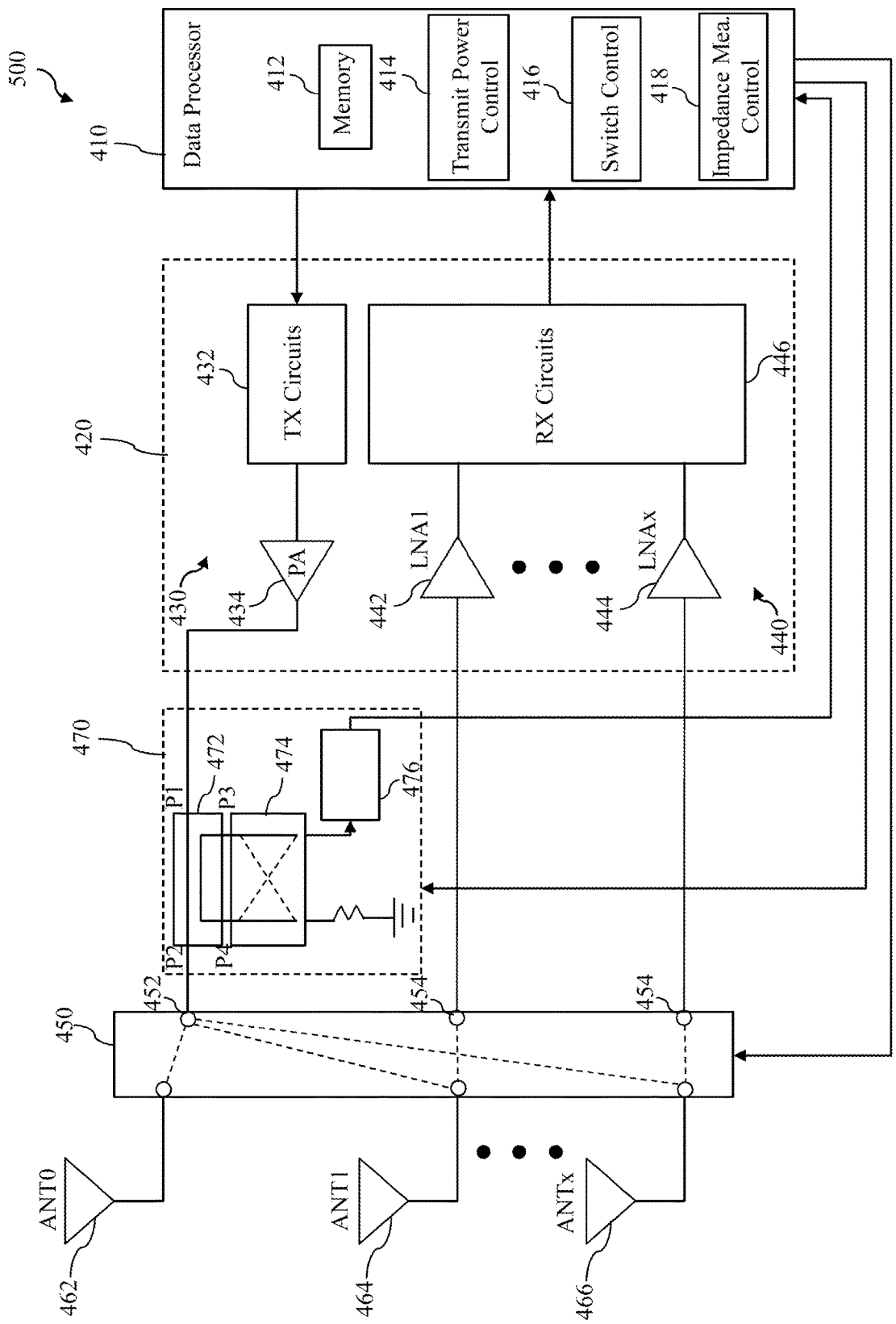
FIG. 5 illustrates another example wireless communication device that supports sounding reference signals in accordance with aspects of the present disclosure.

FIG. 5 shows a circuit diagram 500 of an exemplary UE 115 that includes a measurement circuit 470. In this exemplary design, the UE 115 includes a data processor (controller) 410, a transceiver 420, an antenna switch array 450, and a plurality of antennas including antenna 462, antenna 464, and antenna 466 as discussed for circuit diagram 400. The measurement circuit 470 couples between the PA 434 and the antenna switch array 450. The measurement circuit 470 may be external to the transceiver 420 (as shown in FIG. 5) or internal to the transceiver 420. The operation of the measurement circuit 470 may be controlled by an impedance measurement controller 418 in the data processor 410.

The measurement circuit 470 may include a directional coupler 472, a switch 474, and a signal detector 476. The directional coupler 472 may receive an input RF signal at a first port P1, provide an output RF signal at a second port P2, and provide a forward (coupled) RF signal at a third port P3. The directional coupler 472 may also provide a reflected RF signal at a fourth port P4. Directional coupler 472 thus functions to sample the amplified SRS from PA 434 to provide the forward signal. Due to non-idealities, the amplified SRS is not converted entirely to free-space propagation by the selected antenna but instead a portion is reflected back to PA 434. Directional coupler 472 also functions to sample this reflection to form the reflected signal at fourth port P4. The signal detector 476 may be a square-law power detector, a phase and amplitude signal detector, or other suitable types of signal detectors. The signal detector 476 may receive RF signals at different ports of directional coupler 472 and may measure the voltage, current, power, and/or other characteristics of the RF signals. The measurement circuit 470 may then characterize both the real and imaginary parts (or just the magnitude) of the reflection coefficient for the selected antenna. The switch 474 may be a "2" pole "2" throw (DPDT) switch. In one state, the switch 474 connects port 4 (P4) of the directional coupler 472 to a terminating impedance such as ground through a matched load and connects port 3 (P3) to the signal detector 476 so that the forward signal may be sampled. In another state, the switch 474 connects port 4 to the signal detector 476 and connects port 3 to a terminating impedance such as ground through the matched load so that the reflected signal may be sampled. In this fashion, directional coupler 472 may be used to sample both the forward and reflected signals. In other implementations, one directional coupler may be used to sample the forward signal and another (separate) directional coupler may be used for sampling the reflected signal.

During the transmission of an SRS from a selected antenna, when the switch 474 is set in a first state, the signal detector 476 may detect a voltage $V_f$ indicative of the forward signal. When the switch 474 is set in a second state, the signal detector 476 may detect a voltage $V_r$ indicative of the reflected signal. Since power is a function of voltage and current, the voltage $V_f$ is proportional to the forward power. Similarly, the voltage $V_r$ is proportional to the reverse power.

After the determination of the voltage $V_f$ and the voltage $V_r$, the ratio $V_r/V_f$ may be determined such as by impedance measurement controller 418. The voltages $V_r$ and $V_f$ are proportional to the forward power and reflected power, respectively. The ratio $V_r/V_f$ defines a voltage reflection coefficient, $\Gamma$. The voltage reflection coefficient, $\Gamma$, may then be used to determine the VSWR such as given by the following Equation (1):

$$\text{VSWR}=(1+|\Gamma|)/(1-|\Gamma|) \qquad \text{Equation (1)}$$

Smaller values of VSWR indicate less reflection and a better match between the antenna and the radio (or the antenna and the transmission line). As may be determined from Equation (1) above, the lowest possible value for VSWR is 1. For example, if there are no reflections such that the reflection coefficient is 0, then the result of Equation (1) is 1. When the reflection coefficient is 0 no reflections are occurring, i.e., the antenna and the radio or the antenna and the transmission medium are perfectly matched. No power is being reflected when the VSWR is 1. As reflections increase, the VSWR increases accordingly. Performance may decrease as VSWR increases. Accordingly, lower values of VSWR may be preferable.

In some implementations, the signal detector 476 is capable of calculating the VSWR and/or other figures of merit (e.g., return loss) from the measurements of $V_f$ and $V_r$ and report the calculated results to the data processor 410. In some implementations, the signal detector 476 includes an analog-to-digital converter (ADC) that digitizes the measurements from the signal detector 476 and provides digitized measurement values of the voltages $V_r$ and $V_f$. The digitized values of the voltages $V_r$ and $V_f$ may be transmitted to the data processor 410 so that impedance measurement controller 418 may calculate the desired figure of merit.

Another figure of merit that relates to how well an antenna is matched is the return loss. Return loss (RL), expressed in decibels may be defined as in the following Equation (2):

$$\text{RL}_{dB}=20 \log(V_f/V_r)=20 \log(1/\Gamma) \qquad \text{Equation (2)}$$

Accordingly, the return loss is related to VSWR as indicated in the following Equation (3):

$$\text{RL}_{dB}=20 \log((\text{VSWR}+1)/(\text{VSWR}-1)) \qquad \text{Equation (3)}$$

Equations (1)-(3) may each be calculated using the measurements described above. Accordingly, the VSWR and return loss may each be calculated from the measurements of $V_f$ and $V_r$. Using Equations (1)-(3), values indicating how well impedance is matched between an antenna and the transceiver may be generated. Accordingly, in some implementations, the UE 115 includes an antenna tuning network (e.g., tuners) coupled to the antennas, and the values indicating how well impedance is matched to an antenna may be compared to adjust the antenna tuning network to improve antenna impedance matching. Using both the real and the imaginary components of reflection coefficient may improve the tuning process. In other implementations, only the magnitude of the reflection coefficient may be utilized in the tuning process. The tuning process will now be discussed in more detail.

Figure 6:
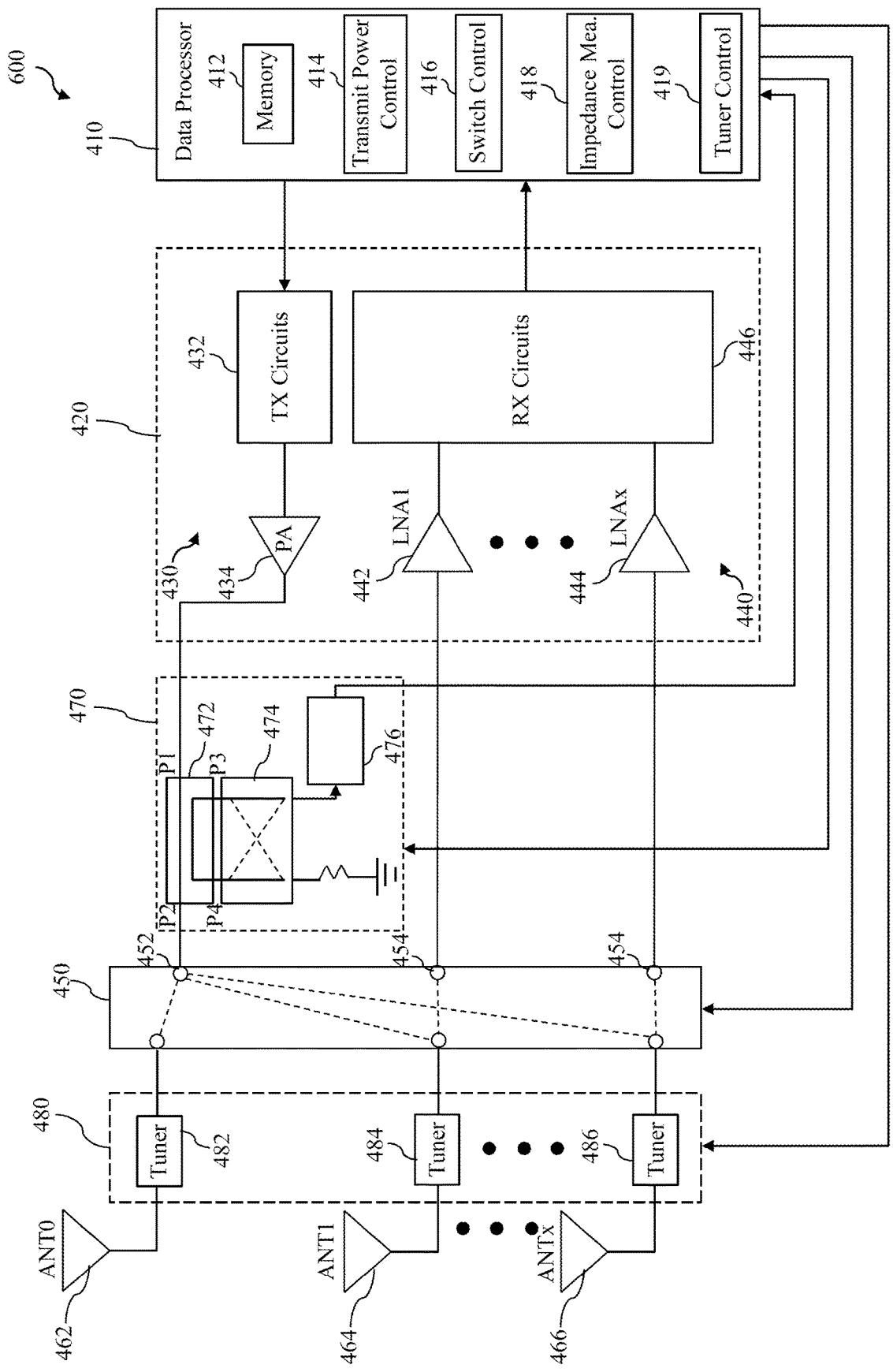
FIG. 6 illustrates another example wireless communication device that supports sounding reference signals in accordance with aspects of the present disclosure.

FIG. 6 shows a circuit diagram 600 of an exemplary design of UE 115 that includes an antenna tuning network 480. The circuit diagram 600 is generally similar to the circuit diagram 500 in FIG. 5 and to the circuit diagram 400 in FIG. 4. In this exemplary design, the UE 115 includes a data processor (controller) 410, a transceiver 420, an antenna switch array 450, a plurality of antennas including antenna 462, antenna 464, and antenna 466, and measurement circuit 470. The antenna tuning network 480 couples between the antenna switch array 450 and the antennas. The antenna tuning network 480 may include a tuner for each antenna. For example, a tuner 482 couples to the TX antenna 462, a tuner 484 couples to the RX antenna 464, and a tuner 486 couples to the RX antenna 466. In general, a UE may include any number of tuners for any number of TX/RX antennas. The operation of the antenna tuning network 480, and accordingly each of the tuners 482, 484, and 486 may be controlled by a tuner controller 419 in the data processor 410. Each of the tuners performs impedance and/or power matching for an antenna and may also be referred to as a matching circuit, a tunable matching circuit, or an antenna tuning circuit. In one implementation, the tuners 482, 484, 486 are impedance tuners that may be configured to adjust impedance loading to the corresponding antennas 462, 464, and 466, respectively. In another instance, the tuners 482, 484, 486 are aperture tuners that may be configured to adjust effective apertures of the antennas 462, 464, and 466, which in turn adjusts impedance and/or power matching of the antennas 462, 464, and 466.

As illustrated in FIG. 6, the antenna switch array 450 may sequentially connect antennas 462, 464, 466 and their respective tuners 482, 484, 486 to the directional coupler 472. The directional coupler 472 together with the switch 474 and the signal detector 476 may be used to measure a value indicating how well an antenna impedance is matched. Depending on the antenna being selected through the antenna switch array 450, the reflection coefficient may be measured accordingly.

Note that each tuner may be set initially to some default value and then periodically updated by the SRS speed gamma detection process to better match to the corresponding antenna. For example, each tuner may be configured to provide an adjustable capacitance and/or an adjustable inductance. In addition, each tuner may be configured to provide an adjustable resistance. Taking the tuner 486 as an example, the tuner 486 and the RX antenna 466 may be selected by antenna switch array 450 so that the measurement circuit 470 may measure the corresponding reflection coefficient during the transmission of the SRS by the RX antenna 466. Subsequently, the tuner 486 may be configured by the tuner controller 419 to achieve a better matching to RX antenna 466 such as through an adjustment of the tuner capacitance and/or an adjustment of the tuner inductance or resistance. Note that the antenna impedance measurement may be performed in one frequency band, but the resulting tuning may be applied to other frequency bands. For example, it may be determined how impedance varies with frequency, e.g., based on a previous characterization operation conducted on the UE 115 or on a representative device. Such relationship may be stored by the UE 115, for example in the memory 412. In some configurations, an antenna impedance measurement performed in one frequency band or a subset of frequency bands can be used to determine the antenna impedance at other frequency bands, for example by the impedance measurement controller 418 or another component of the data processor 410. A method of SRS speed gamma detection will now be discussed in more detail.

Figure 7:
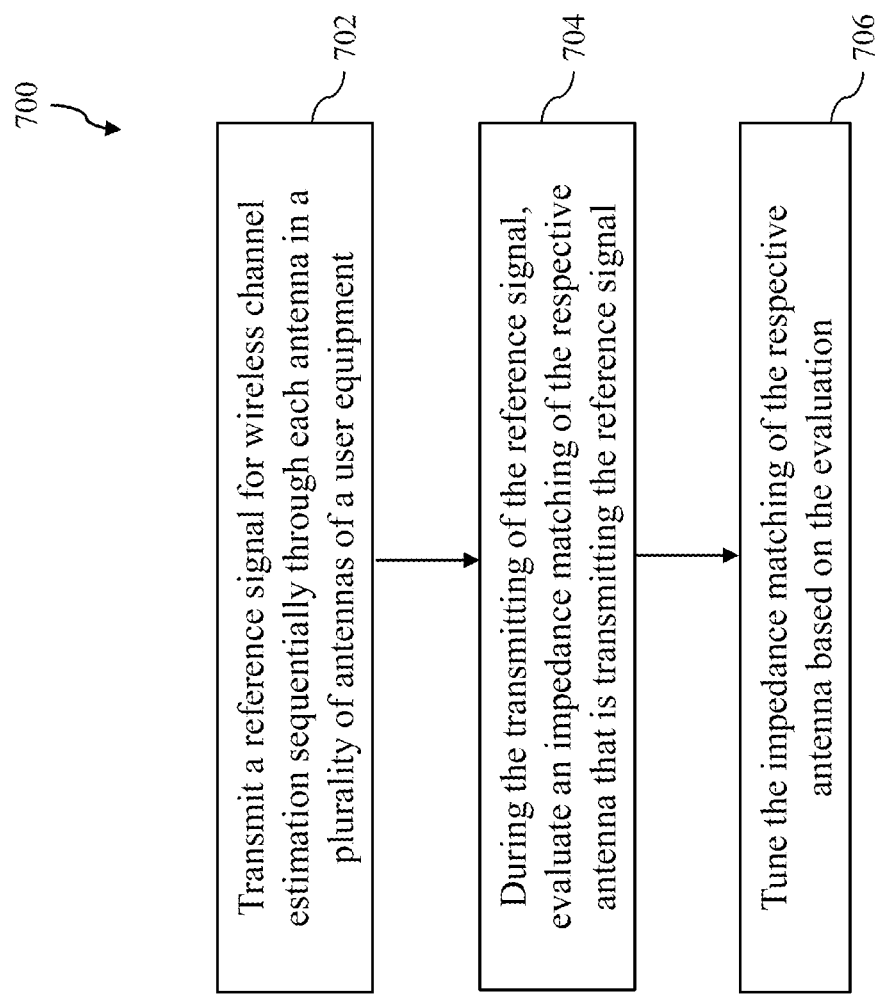
FIG. 7 is a flowchart of a method of antenna impedance detection using sounding reference signals in accordance with aspects of the present disclosure.

FIG. 7 is a flowchart of a method of SRS speed gamma detection in accordance with this disclosure. The method begins with an act 700 of sequentially selecting each antenna in a plurality of antennas of the UE through an antenna switch array. The plurality of antennas may be every antenna in the UE or may be a subset of the antennas in the UE such as a subset of antennas configured for a certain RAT or a certain frequency band. The sequential selection of antennas 462, 464, and 466 by antenna switch array 450 is an example of act 700. The following acts of the method occur during the selection of a given antenna and include an act 705 of amplifying a reference signal through an amplifier to provide an amplified reference signal. The amplification of the SRS for a selected antenna by PA 434 is an example of act 705. In addition, the method includes the act 710 of transmitting the amplified reference signal through the antenna to cause a reflected signal to reflect back to the amplifier. The transmission of the amplified SRS by a selected antenna and the formation of the reflected signal at directional coupler 472 is an example of act 710. The method also includes an act 715 of evaluating an impedance matching of the antenna based upon a sample of the amplified reference signal and a sample of the reflected signal. The evaluation of the reflection coefficient for the selected antenna by measurement circuit 470 is an example of act 715. Finally, the method includes an act 720 of tuning the impedance matching of the antenna based on the evaluating of the impedance matching. The tuning of any of tuners 482, 484, or 486 by tuner controller 419 is an example of act 720.

The disclosure will now be summarized in the following example clauses.

Clause 1. An apparatus for wireless communication, comprising:
  a plurality of antennas including at least one transmit antenna and at least one receive antenna;
  an amplifier;
  an antenna switch array coupled to the plurality of antennas;
  a directional coupler coupled between the amplifier and the antenna switch array; and
  a controller configured to:
    control the antenna switch array to sequentially select each antenna in the plurality of antennas so as to transmit a reference signal amplified by the amplifier from the antenna and to cause the directional coupler to produce a reflected signal from the antenna; and
    determine a reflection coefficient for each antenna responsive to a reflected signal from the antenna.

Clause 2. The apparatus of clause 1, wherein the reference signal is configured to estimate a wireless channel.

Clause 3. The apparatus of clause 2, wherein the reference signal is a sounding reference signal (SRS).

Clause 4. The apparatus of any of clauses 1-3, wherein the controller is further configured to control the amplifier to transmit the reference signal in intervals separated by guard periods, and wherein the reflection coefficient for each antenna is determined within a duration of an interval in which the antenna transmits the reference signal.

Clause 5. The apparatus of any of clauses 1-4, wherein the directional coupler is configured to receive the reference signal from the amplifier at a first port, pass the reference signal from the first port to the antenna switch array at a second port, provide a coupled signal at a third port, and a reflected signal at a fourth port, the apparatus further comprising:
  a signal detector coupled to the directional coupler and configured to measure at least a magnitude of the coupled signal and a magnitude of the reflected signal.

Clause 6. The apparatus of clause 5, wherein signal detector is further configured to measure a phase of the coupled signal and a phase of the reflected signal.

Clause 7. The apparatus of any of clauses 1-6, further comprising:
  a plurality of tuners corresponding to the plurality of antennas,
  wherein the controller is further configured to adjust each tuner to improve an impedance matching to a corresponding one of the antennas.

Clause 8. The apparatus of clause 7, wherein one of more tuners in the plurality of tuners each comprises an impedance tuner.

Clause 9. The apparatus of clause 7, wherein one of more tuners in the plurality of tuners each comprises an antenna aperture tuner.

Clause 10. The apparatus of any of clauses 1-9, wherein the controller is further configured to determine a voltage standing wave ratio (VSWR) of each antenna.

Clause 11. The apparatus of any of clauses 1-10, wherein the amplifier is a power amplifier.

Clause 12. A user equipment (UE) for wireless communication, comprising:
- a transmit antenna;
- a receive antenna;
- a transceiver configured to generate one or more sounding reference signals (SRS) for wireless channel estimation;
- an antenna switch array configured to separately select the transmit antenna and the receive antenna in sequence to transmit the one or more SRS;
- a first tuner coupled between the transmit antenna and the antenna switch array;
- a second tuner coupled between the receive antenna and the antenna switch array;
- a directional coupler coupled between the transceiver and the antenna switch array; and
- a controller configured to adjust the first tuner and the second tuner based on signals from the directional coupler during the sequence.

Clause 13. The UE of clause 12, further comprising: a signal detector coupled to the directional coupler and configured to detect the signals from the directional coupler during the sequence.

Clause 14. The UE of clause 13, wherein the directional coupler has a first port to receive the one or more SRS, a second port to relay the one or more SRS to the antenna switch array, a third port to provide a forward signal, and a fourth port to provide a reflected signal.

Clause 15. The UE of clause 13, wherein the signal detector is configured to determine the reflection coefficient of the transmit antenna responsive to a ratio of a first forward signal from the directional coupler to a first reflected signal from the directional coupler while the antenna switch array selects for the transmit antenna, and wherein the signal detector is further configured to determine the reflection coefficient of the receive antenna responsive to a ratio of a second forward signal from the directional coupler to a second reflected signal from the directional coupler while the antenna switch array selects for the receive antenna.

Clause 16. The UE of clause 15, further comprising an amplifier configured to amplify the one or more SRS.

Clause 17. The UE of clause 16, wherein the controller is configured to adjust the first tuner responsive to the reflection coefficient of the transmit antenna and to adjust the second tuner responsive to the reflection coefficient of the receive antenna.

Clause 18. The UE of any of clauses 12-17, wherein the first tuner comprises a first impedance tuner and the second tuner comprises a second impedance tuner.

Clause 19. The UE of any of clauses 12-17, wherein the first tuner comprises a first antenna aperture tuner and the second tuner comprises a second antenna aperture tuner.

Clause 20. A method for wireless communication of a user equipment (UE), comprising:
- sequentially selecting each antenna in a plurality of antennas of the UE through an antenna switch array; and
- while each antenna is selected by the antenna switch array:
  - amplifying a reference signal through an amplifier to provide an amplified reference signal;
  - transmitting the amplified reference signal through the antenna to cause a reflected signal to reflect back to the amplifier;
  - evaluating an impedance matching of the antenna based upon a sample of the amplified reference signal and of the reflected signal; and
  - tuning the impedance matching of the antenna based on the evaluating of the impedance matching.

Clause 21. The method of clause 20, wherein sequentially selecting each antenna includes selecting a transmit antenna and includes selecting a receive antenna.

Clause 22. The method of any of clauses 20-21, further comprising sampling the amplified reference signal and the reflected signal in a directional coupler.

Clause 23. The method of any of clauses 20-22, wherein the reference signal is a sounding reference signal (SRS).

Clause 24. The method of any of clauses 20-23, wherein tuning the impedance matching for each antenna comprises tuning an impedance tuner coupled to the antenna.

Clause 25. The method of any of clauses 20-24, wherein the plurality of antennas comprises a subset of antennas for the UE.

Clause 26. The method of any of clauses 20-24, wherein the plurality of antennas includes every antenna in the UE.

It should be noted that the methods described herein describe possible implementations, and that the operations and the steps may be rearranged or otherwise modified and that other implementations are possible. Further, aspects from two or more of the methods may be combined.

The description set forth herein, in connection with the appended drawings, describes example configurations and does not represent all the examples that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described examples. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication, comprising:
- a plurality of antennas including at least one transmit antenna and at least one receive antenna;
- a plurality of tuners corresponding to the plurality of antennas;
- an amplifier;
- an antenna switch array coupled to the plurality of antennas;
- a directional coupler coupled between the amplifier and the antenna switch array; and
- a controller configured to:
  - control the antenna switch array to sequentially select each antenna in the plurality of antennas so as to transmit a reference signal configured to be used by a base station to estimate a downlink wireless channel from the base station to the apparatus and amplified by the amplifier from the antenna and to cause the directional coupler to produce a reflected signal from the antenna; and determine a reflection coefficient for each antenna responsive to a reflected signal from the antenna, wherein the controller is further configured to adjust each tuner to improve an impedance matching to a corresponding one of the antennas, and wherein the controller is further configured to control the amplifier to transmit the reference signal in intervals separated by guard periods, and wherein the reflection coefficient for each antenna is determined within a duration of an interval in which the antenna transmits the reference signal.

2. The apparatus of claim 1, wherein the reference signal is a sounding reference signal (SRS).

3. The apparatus of claim 1, wherein the directional coupler is configured to receive the reference signal from the amplifier at a first port, pass the reference signal from the first port to the antenna switch array at a second port, provide a coupled signal at a third port, and a reflected signal at a fourth port, the apparatus further comprising:
  a signal detector coupled to the directional coupler and configured to measure at least a magnitude of the coupled signal and a magnitude of the reflected signal.

4. The apparatus of claim 3, wherein the signal detector is further configured to measure a phase of the coupled signal and a phase of the reflected signal.

5. The apparatus of claim 1, wherein one of more tuners in the plurality of tuners each comprises an impedance tuner.

6. The apparatus of claim 1, wherein one of more tuners in the plurality of tuners each comprises an antenna aperture tuner.

7. The apparatus of claim 1, wherein the controller is further configured to determine a voltage standing wave ratio (VSWR) of each antenna.

8. The apparatus of claim 1, wherein the amplifier is a power amplifier.

9. A user equipment (UE) for wireless communication, comprising:
  a transmit antenna;
  a receive antenna;
  a transceiver configured to generate one or more sounding reference signals (SRS) for wireless channel estimation;
  an antenna switch array configured to separately select the transmit antenna and the receive antenna in a sequence to transmit the one or more SRS in intervals separated by guard periods;
  a first tuner coupled between the transmit antenna and the antenna switch array;
  a second tuner coupled between the receive antenna and the antenna switch array;
  a directional coupler coupled between the transceiver and the antenna switch array;
  a controller configured to adjust the first tuner and the second tuner during the intervals based on signals from the directional coupler during the sequence; and
  a signal detector coupled to the directional coupler and configured to detect the signals from the directional coupler during the sequence.

10. The UE of claim 9, wherein the directional coupler has a first port to receive the one or more SRS, a second port to relay the one or more SRS to the antenna switch array, a third port to provide a forward signal, and a fourth port to provide a reflected signal.

11. The UE of claim 9, wherein the signal detector is configured to determine a reflection coefficient of the transmit antenna responsive to a ratio of a first forward signal from the directional coupler to a first reflected signal from the directional coupler while the antenna switch array selects for the transmit antenna, and wherein the signal detector is further configured to determine a reflection coefficient of the receive antenna responsive to a ratio of a second forward signal from the directional coupler to a second reflected signal from the directional coupler while the antenna switch array selects for the receive antenna.

12. The UE of claim 11, further comprising an amplifier configured to amplify the one or more SRS.

13. The UE of claim 11, wherein the controller is configured to adjust the first tuner responsive to the reflection coefficient of the transmit antenna and to adjust the second tuner responsive to the reflection coefficient of the receive antenna.

14. The UE of claim 9, wherein the first tuner comprises a first impedance tuner and the second tuner comprises a second impedance tuner.

15. The UE of claim 9, wherein the first tuner comprises a first antenna aperture tuner and the second tuner comprises a second antenna aperture tuner.

16. A method for wireless communication of a user equipment (UE), comprising:
  sequentially selecting each antenna in a plurality of transmit and receive antennas of the UE through an antenna switch array; and
  while each antenna is selected by the antenna switch array:
    amplifying a reference signal through an amplifier to provide an amplified reference signal, wherein the reference signal is configured to be used by a base station to estimate a downlink channel from the base station to the UE;
    transmitting the amplified reference signal in an interval followed by a guard period through the antenna to cause a reflected signal to reflect back to the amplifier;
    evaluating an impedance matching of the antenna based upon a sample of the amplified reference signal and the reflected signal during the interval; and
    tuning the impedance matching of the antenna based on the evaluating of the impedance matching.

17. The method of claim 16, further comprising sampling the amplified reference signal and the reflected signal in a directional coupler.

18. The method of claim 16, wherein the reference signal is a sounding reference signal (SRS).

19. The method of claim 16, wherein tuning the impedance matching for each antenna comprises tuning an impedance tuner coupled to the antenna.

20. The method of claim 16, wherein the plurality of antennas is a subset of antennas for the UE.

21. The method of claim 16, wherein the plurality of antennas includes every antenna in the UE.

* * * * *